United States Patent
Duve

(10) Patent No.: US 9,206,063 B2
(45) Date of Patent: Dec. 8, 2015

(54) IMMERSION REACTOR

(75) Inventor: Johannes Duve, Dülmen (DE)

(73) Assignee: Infracor GmbH, Marl (DE)

( * ) Notice: Subject to any disclaimer, the term of this patent is extended or adjusted under 35 U.S.C. 154(b) by 482 days.

(21) Appl. No.: 13/641,576

(22) PCT Filed: Feb. 17, 2011

(86) PCT No.: PCT/EP2011/052334
§ 371 (c)(1),
(2), (4) Date: Jan. 2, 2013

(87) PCT Pub. No.: WO2011/128137
PCT Pub. Date: Oct. 20, 2011

(65) Prior Publication Data
US 2013/0106003 A1    May 2, 2013

(30) Foreign Application Priority Data

Apr. 16, 2010 (DE) .......................... 10 2010 027 840

(51) Int. Cl.
*C02F 1/76* (2006.01)
*B01J 19/26* (2006.01)
(Continued)

(52) U.S. Cl.
CPC ............... *C02F 1/763* (2013.01); *B01F 3/0876* (2013.01); *B01F 5/043* (2013.01); *B01J 4/002* (2013.01); *B01J 19/26* (2013.01); *C01B 11/024* (2013.01); *B01F 2003/04907* (2013.01)

(58) Field of Classification Search
CPC ...................................................... C02F 1/763
See application file for complete search history.

(56) References Cited

U.S. PATENT DOCUMENTS 3,862,279 A    1/1975 Andersen, Sr.
4,247,531 A    1/1981 Hicks
(Continued)

FOREIGN PATENT DOCUMENTS

DE    10 2008 042 424    6/2009
DE    10 2008 049 734    4/2010
(Continued)

OTHER PUBLICATIONS

"Disinfectants", Scientific and Research Institute for Technical and Economic Research in Chemical Industry, Survey Information, ISSN 0203-7971, 1986, 3 pages. (English Translation).
(Continued)

*Primary Examiner* — Lessanework Seifu
(74) *Attorney, Agent, or Firm* — Oblon, McClelland, Maier & Neustadt, L.L.P.

(57) ABSTRACT

The invention relates to an apparatus (1) for feeding chlorine dioxide to water, comprising a first feed pipe (5a) for feeding in a first reaction component, comprising a second feed pipe (5b) for feeding in a second reaction component, comprising a mixing tube (2) for mixing and reacting the two reaction components to chlorine dioxide, at one end of which the two feed pipes (5a, 5b) join and at the other end of which is arranged a suction chamber (4) into which feed water to be enriched with chlorine dioxide can be sprayed by means of a nozzle (12), and comprising an exit water pipe (13) leading downstream from the suction chamber (4). This object is further to develop such an apparatus so that it is simple and has a robust design and permits different chlorine dioxide syntheses based on two reaction components to be carried out without danger. This object is achieved if the mixing tube (2) is provided with an ancillary entry opening (10) for the entry of ancillary water to be enriched with chlorine dioxide and free of reaction components.

15 Claims, 3 Drawing Sheets

Figure 1:
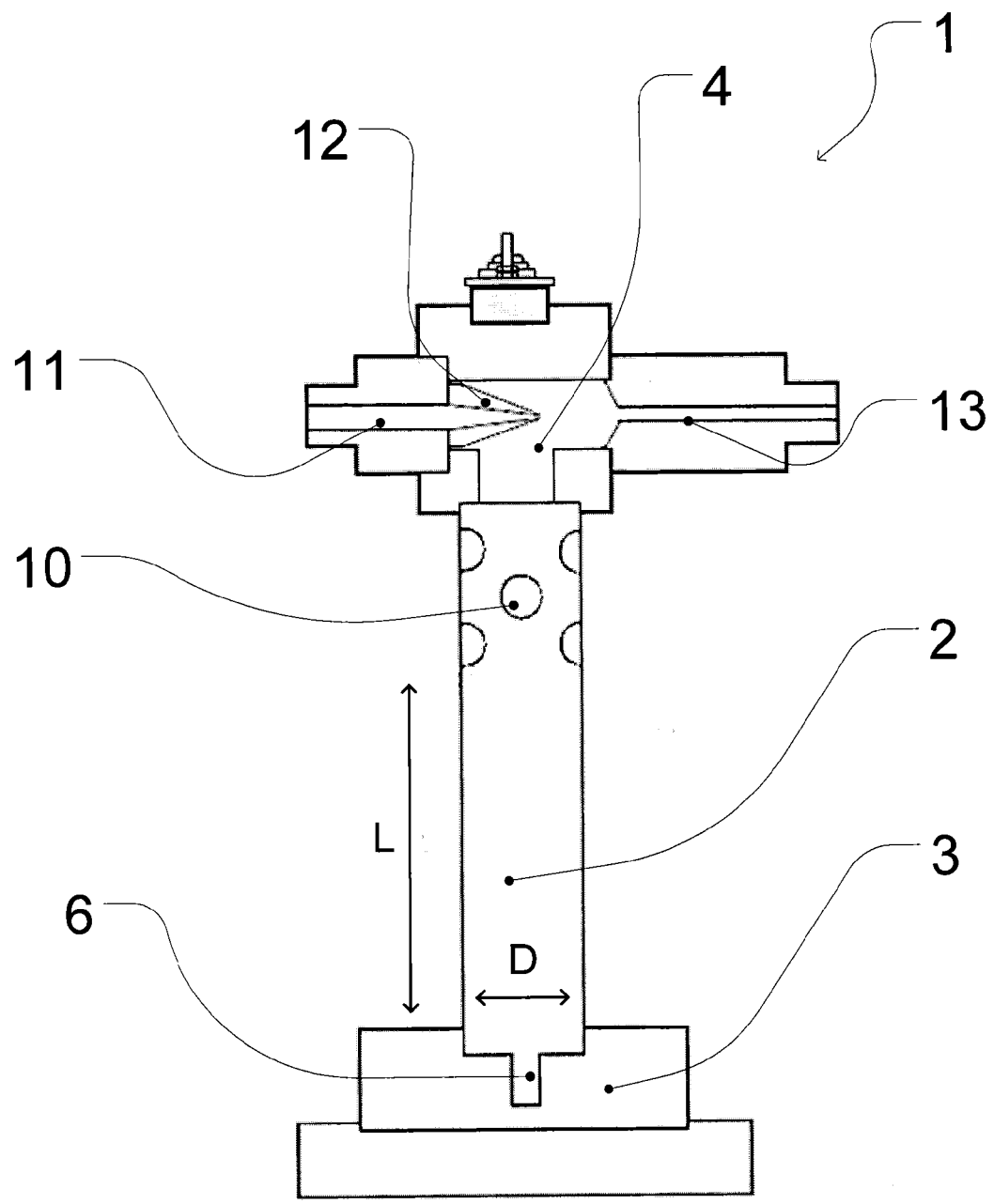

(51) Int. Cl.
*B01F 3/08* (2006.01)
*B01F 5/04* (2006.01)
*B01J 4/00* (2006.01)
*C01B 11/02* (2006.01)
*B01F 3/04* (2006.01)

(56) References Cited

U.S. PATENT DOCUMENTS

| | | | |
|---|---|---|---|
| 4,472,256 | A | 9/1984 | Hilbig |
| 4,582,586 | A | 4/1986 | Maddock |
| 5,204,081 | A * | 4/1993 | Mason et al. .......... 423/478 |
| 6,051,135 | A | 4/2000 | Lee et al. |
| 6,468,479 | B1 | 10/2002 | Mason et al. |
| 2003/0091497 | A1 | 5/2003 | Mason et al. |
| 2005/0244328 | A1 | 11/2005 | Schmitz et al. |
| 2008/0219087 | A1 | 9/2008 | Flynn et al. |
| 2009/0159538 | A1 | 6/2009 | Duve |
| 2010/0155341 | A1 | 6/2010 | Duve |
| 2011/0220587 | A1 | 9/2011 | Duve |

FOREIGN PATENT DOCUMENTS

| | | |
|---|---|---|
| EP | 0 024 851 | 3/1981 |
| EP | 0 153 841 A2 | 9/1985 |
| GB | 763935 | 12/1956 |
| IT | 1351156 | 1/2009 |
| JP | 60-239304 A | 11/1985 |
| JP | 11-10164 A | 1/1999 |
| JP | 2003-260468 A | 9/2003 |
| JP | 2004-143004 A | 5/2004 |
| JP | 2005-319381 A | 11/2005 |
| JP | 2008 94662 | 4/2008 |
| JP | 2008-94662 A | 4/2008 |
| RU | 45378 U2 | 4/2000 |
| RU | 2163882 C2 | 4/2000 |
| WO | 02 14216 | 2/2002 |
| WO | 03 000586 | 1/2003 |
| WO | 2009 077213 | 6/2009 |
| WO | 2009 077309 | 6/2009 |
| WO | 2010 069632 | 6/2010 |
| WO | 2011 131389 | 10/2011 |

OTHER PUBLICATIONS

Dripping Wet Water., "Using Catalytic Chlorine Dioxide to Eradicate Legionella in a Cooling Tower," Case Study, A Water Treater's Perspective, pp. 1 to 2, (Jan. 1, 2009), XP-55009057.
International Search Report Issued Oct. 18, 2011 in PCT/EP11/52334 Filed Feb. 17, 2011.

* cited by examiner

IMMERSION REACTOR

The invention relates to an apparatus for adding chlorine dioxide to water according to the precharacterizing clause of claim 1. It furthermore relates to an apparatus for adding chlorine gas to water and a water bath in which an apparatus according to the invention is immersed.

Such an apparatus is known from a consideration of WO2004078648A1 and WO2003000586A1 together.

Chlorine dioxide [$ClO_2$] is a highly poisonous, explosive chemical which is used as a biocide in the disinfection of water. The latter may be drinking water, swimming pool water or industrial water, in particular cooling water.

Owing to its dangerousness and low stability, chlorine dioxide is reluctantly transported or stored and is rather synthesized directly at the place of use, in particular in the water to be treated.

Difference synthesis routes are known for chlorine dioxide. On the industrial scale, chlorine dioxide is often produced from sodium chlorite or sodium chlorate with the use of hydrochloric acid, chlorine or sulphuric acid/hydrogen peroxide.

In the chlorite/acid process, hydrochloric acid [HCl] is reacted with sodium chlorite [$NaClO_2$] to give chlorine dioxide, water [$H_2O$] and sodium chloride [NaCl]:

$$5NaClO_2 + 4HCl \rightarrow 4ClO_2 + 5NaCl + 2H_2O$$

In the chlorite/chlorine process, the stoichiometry of the reaction is:

$$2NaClO_2 + Cl_2 \rightarrow 2ClO_2 + 2NaCl$$

In the chlorate process, sulphuric acid [$H_2SO_4$] is reacted with hydrogen peroxide [$H_2O_2$] and sodium chlorate [$NaClO_3$] to chlorine dioxide, sodium sulphate [$Na_2SO_4$], oxygen [$O_2$] and water:

$$2NaClO_3 + H_2O_2 + H_2SO_4 \rightarrow 2ClO_2 + Na_2SO_4 + O_2 + 2H_2O$$

DE202004005755U1 discloses an apparatus for adding chlorine dioxide to water, in which two reaction components forming the chlorine dioxide are passed into a mixing tube installed in a water pipe. Water to be treated is fed in and removed via the water pipe. The mixing tube open at both ends extends coaxially within the water pipe. A disadvantage of this apparatus is that the mixing tube, producing flow resistance in the water pipe, causes turbulences which continue into the mixing tube and adversely affect the reaction.

WO2004078648A1 referring directly to WO2003000586A1 discloses a generic apparatus in which the mixing tube is present outside the water pipe. Rather, a suction chamber in which the feed water to be treated is sprayed in by means of a tapering nozzle is arranged in the water pipe. The cross section of the suction chamber is substantially greater in comparison with the nozzle and with the exit water pipe continuing from the suction chamber, so that reduced pressure results in the suction chamber. The mixing tube which runs radially to the exit water pipe opens into the suction chamber. Via two feed pipes opening into the mixing tube, in each case one reaction component—firstly aqueous sulphuric acid and secondly sodium chlorate in hydrogen peroxide—is infused into the mixing tube. The reduced pressure sucks the components through the mixing tube, in which they mix and, in accordance with the chlorate process, react with one another to give chlorine dioxide.

Dilution of the reaction mixture with the water sprayed in then takes place in the suction chamber so that water having the desired chlorine dioxide content leaves the apparatus via the exit water pipe.

In order to control the strongly exothermic sulphuric acid process, the feed pipe for the aqueous sulphuric acid is provided with a cooling device. This makes the design of the apparatus comparatively complicated.

JP 2002-220207 A discloses an apparatus for adding chlorine dioxide to water, which apparatus carries out a hypochlorite/chlorite-based process in two stages:

Stage 1: $NaClO + 2HCl \rightarrow Cl_2 + NaCl + H_2O$
Stage 2: $2NaClO_2 + Cl_2 \rightarrow 2ClO_2 + 2NaCl$ For this purpose, the two reaction components sodium hypochlorite [NaClO] and hydrochloric acid [HCl] are first mixed and react in a first section of a mixing tube. At the end of the first section, an ancillary entry opening is arranged, through which sodium chlorite [$NaClO_2$], as a third reaction component, enters. The second reaction stage then takes place within a second section of the mixing tube, within which the chlorine dioxide finally forms. A suction chamber in which the chlorine dioxide is mixed with the water to be enriched and is charged via an exit water pipe is arranged at the end of the second section of the mixing tube.

Since highly poisonous chlorine gas $Cl_2$ forms within the first reaction stage, it is always necessary in this apparatus to ensure that this cannot escape to the outside through the ancillary entry opening.

EP 0 119 686 A1 discloses an apparatus for increasing the concentration of chlorine dioxide in water, in which the two reaction components are transported exclusively with the aid of a water jet pump. The metering of the components is brought about via corresponding valves. A disadvantage of this solution is that these valves have to be controlled in a relatively complicated manner. Volume flow meters in the feed pipes are required for this purpose.

Finally, DE 10 2008 049 734 A1 discloses a process and an apparatus for batchwise chlorine dioxide production, in which the apparatus is arranged under water. A disadvantage of batch operation is the necessary control of reaction and flushing operation.

In view of this prior art, it is the object of the present invention to further develop an apparatus of the generic type mentioned at the outset so that it is simple and has a robust design and enables differing chlorine dioxide syntheses based on two reaction components to be carried out without danger.

This object is achieved as the mixing tube is provided with an ancillary entry opening for the entry of ancillary water to be enriched with chlorine dioxide and free of reaction components.

The invention therefore relates to an apparatus for feeding chlorine dioxide to water, comprising a first feed pipe for feeding in a first reaction component, comprising a second feed pipe for feeding in a second reaction component, comprising a mixing tube for mixing and reacting the two reaction components to chlorine dioxide, at one end of which the two feed pipes join and at the other end of which is arranged a suction chamber into which feed water to be enriched with chlorine dioxide can be sprayed by means of a nozzle, and comprising an exit water pipe leading downstream from the suction chamber, in which the mixing tube has at least one ancillary entry opening for the entry of ancillary water to be enriched with chlorine dioxide and free of reaction components into the mixing tube.

The basic concept of the present invention is to carry out the reaction of the components within the protective mixing tube to give chlorine dioxide in comparatively high concentrations and, after the end of the reaction, to dilute the resulting chlorine dioxide abruptly with ancillary water before entry into the suction chamber, so that decomposition of the chlorine dioxide present in high concentration is suppressed and the concentration thereof is shifted to a safe range in the mixing chamber itself.

It is in principle possible to arrange the ancillary entry opening upstream of the joining points. However, this could lead to excessively rapid dilution, so that the reaction components emerging from the joining points no longer completely react. In order to avoid this, the ancillary entry opening is preferably located downstream of both joining points of the feed pipes into the mixing tube.

As has already proved useful in the prior art, nozzle and exit water pipe should be arranged coaxially with one another in the region of the suction chamber.

The design of the apparatus in which the mixing tube extends radially relative to the nozzle and exit water pipe, at least in the region of suction chamber, has likewise proved useful.

This design can particularly preferably be further developed with a base plate which closes that end of the mixing tube facing away from the suction chamber and through which both feed pipes pass, and with a clamping set which exerts an axial force on the mixing tube between base plate and suction chamber. This form is mechanically particularly stable, so that the apparatus can also withstand an explosion of the compounds in the mixing tube.

Instead of a radial orientation of the mixing tube relative to the suction chamber, the mixing tube may extend coaxially with nozzle and with exit water pipe, at least in the region of the suction chamber.

Preferably, the apparatus for reacting hydrochloric acid and sodium chlorite to give chlorine dioxide is used at particularly high doses. Use of the pairs of starting materials sulphuric acid/sodium chlorite and chlorine/sodium chloride is also possible.

Corresponding processes are disclosed in WO 2009/077309 A1 and in WO 2009/077213 A1, respectively.

In order to generate flow conditions which promote the reaction in the mixing tube, the slenderness ratio of the mixing tube should be 5 and 8. In this context, the slenderness ratio is understood as meaning the ratio of the length of the mixing tube to its internal diameter. If the cross section of the tube is not round, the diameter of a circle whose area corresponds to the cross-sectional area of the mixing tube should be used as the internal diameter. The length is measured over the "active section" of the mixing tube, within which the reaction takes place; i.e. from that joining point of the feed pipe of a reaction component which is located furthest downstream to that ancillary entry opening for the ancillary water which is located closest upstream.

The particular advantage of the apparatus according to the invention is that it can be arranged as an immersion reactor directly in the water bath, the water of which is to be enriched with chlorine dioxide. This significantly increases the safety and permits the use of the high starting material concentrations advantageous for the chlorine dioxide synthesis. Accidents which may occur are neutralized by the water surrounding the apparatus.

The invention therefore furthermore relates to a water bath in which an apparatus according to the invention is immersed, at least with its mixing tube, in such a way that ancillary water from the water bath enters the mixing tube through the ancillary entry opening. The water bath is preferably the basin of a cooling tower.

If the apparatus is present in the water bath, the exit water pipe preferably opens into the same water bath, so that the enrichment circulation is closed.

The feed water to be enriched can likewise originate from the water bath, a feed water pipe leading from the water bath to the nozzle being laid for this purpose, optionally with the use of a pressure generator. Alternatively, the feed water may have an origin other than the water bath.

Otherwise, the apparatus can also be used for increasing the concentration of chlorine gas [$Cl_2$] in water. For this purpose, a feed pipe is simply dispensed with and the chlorine gas is passed into the mixing tube through the remaining feed pipe.

The invention therefore also relates to an apparatus for adding chlorine gas to water, comprising a feed pipe for feeding in chlorine gas, comprising a mixing tube for mixing the chlorine gas with water, at one end of which the feed pipe joins and at the other end of which is arranged a suction chamber into which feed water to be enriched with chlorine can be sprayed by means of a nozzle, and comprising an exit water pipe leading downstream from the suction chamber, the mixing tube having at least one ancillary entry opening for the entry of ancillary water to be enriched with chlorine gas into the mixing tube. This variant may also be operated as an immersion reactor.

Even if the chlorine gas is not first prepared in the mixing tube, it is expedient to provide a second feed pipe for feeding water into the mixing tube in order to achieve rapid dilution within the mixing tube. Such an apparatus then corresponds structurally to that for mixing two reaction components, with the difference that, instead of the reaction components, firstly the chlorine gas and secondly the water enter the mixing tube through the two feed pipes.

The invention is now to be explained in more detail with reference to working examples.

Figure 2:
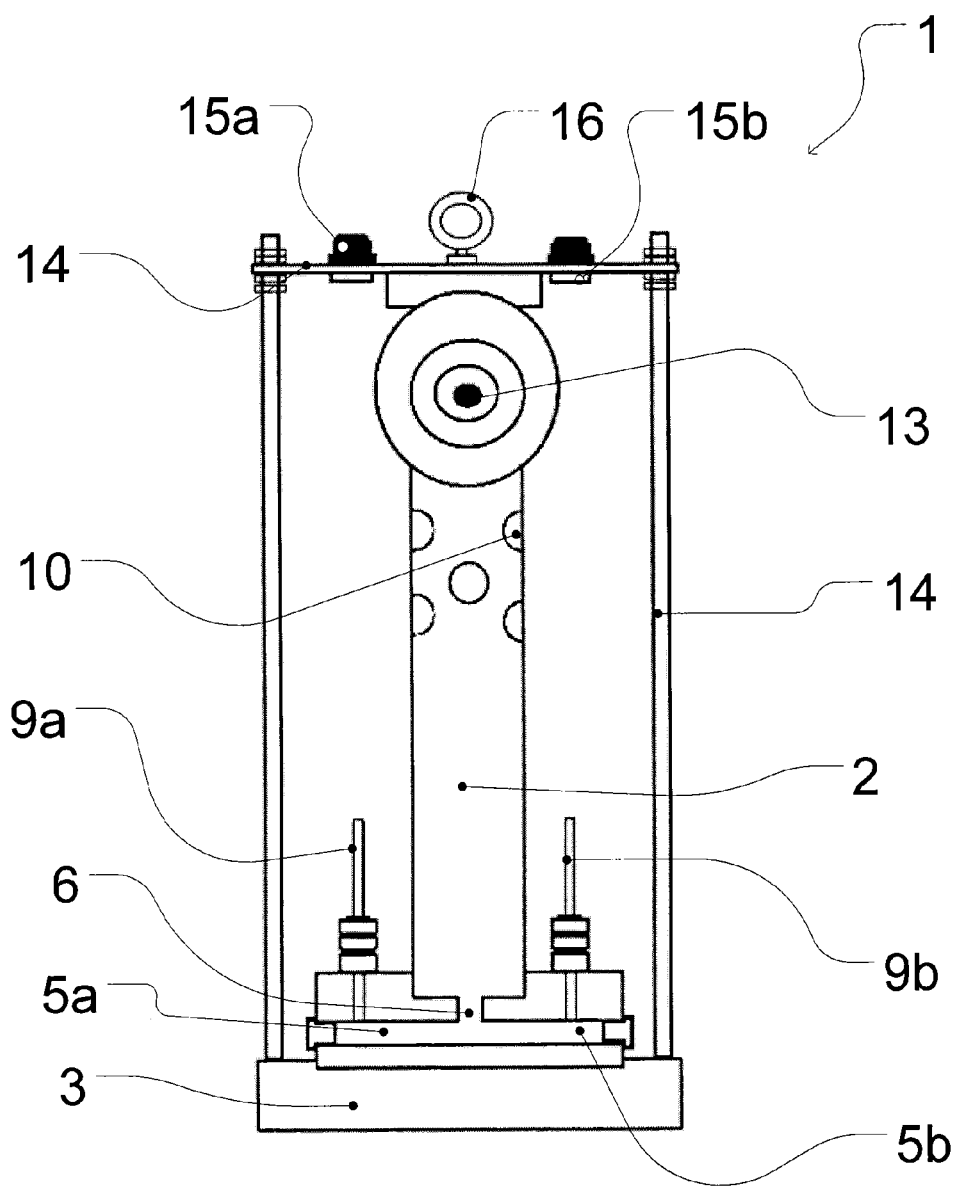
Figure 3:
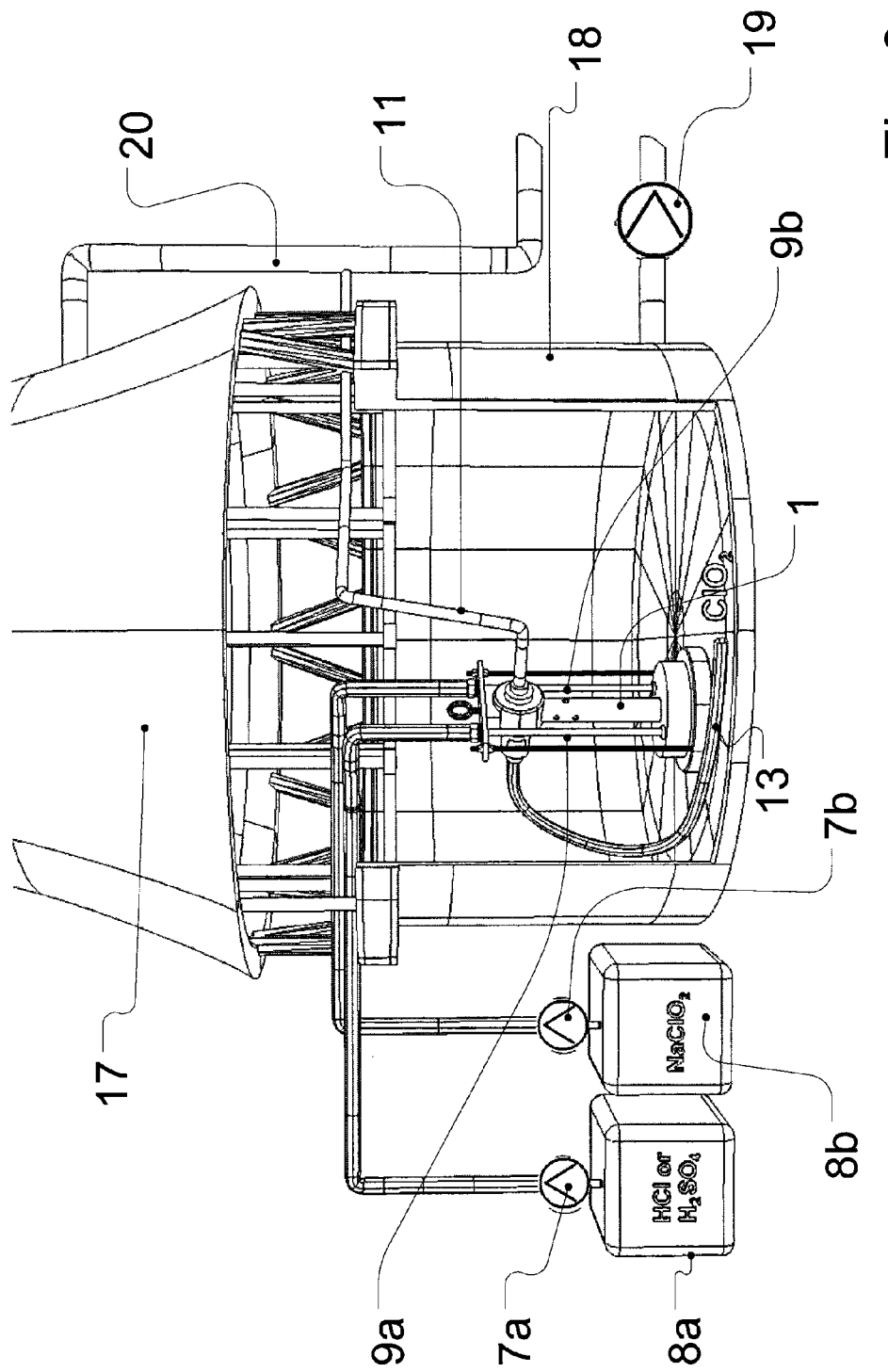

FIG. 1: shows an apparatus in cross section;

FIG. 2: shows an apparatus in front view;

FIG. 3: shows an apparatus as immersion reactor in the basin of a cooling tower;

Table 1: shows a list of dimensions and flow rates of three sizes.

An apparatus 1 according to the invention for the addition of chlorine dioxide to water is shown in FIGS. 1 and 2. The apparatus is lowered as an immersion reactor completely into a water bath whose water is to be enriched with chlorine dioxide; cf. FIG. 3.

The centrepiece of the apparatus is a mixing tube 2 produced from a titanium material and having a circular cross section, which extends from a base plate 3 to a suction chamber 4. The base plate 3 closes one end of the mixing tube 2. Two feed pipes 5*a* and 5*b* for separately feeding two reaction components, such as hydrochloric acid and sodium chlorite, into the mixing tube 2 extend—shown only in FIG. 2—through the base plate 3. The two feed pipes join the mixing tube at a conjoining point 6. Of course, each feed pipe may also have a separate joining point in the mixing tube. In order to be resistant to the reaction components, the base plate 3 is produced from PTFE, at least in the region of the feed pipes 5*a*, 5*b* and their joining point 6. The lower part of the base plate which is not exposed to the chemicals—such as all other components of the apparatus 1—consists of stainless steel.

The reaction components HCl (30 percent strength) and $NaClO_2$ (25 percent strength) travel by means of pumps 7*a*, 7*b* from their respective tanks 8*a*, 8*b* via PTFE hoses 9*a*, 9*b* into the feed pipes 5*a*, 5*b* and through the joining point 6 thereof into the mixing tube 2. In the mixing tube, the components react with chlorine dioxide, sodium chlorite and water. The reaction mixture is transported through the mixing tube by the pumps 7a and 7b. Thus, the pumps 7a, 7b alone predetermine the mixing ratio of the reaction components.

Downstream, immediately before the suction chamber 4, six ancillary entry openings 10 altogether are introduced into the wall of the mixing tube 2. Water, driven by the reduced pressure of the suction chamber, flows through the ancillary entry openings 10 from the environment of the submerged apparatus as ancillary water into the mixing tube 2 and abruptly dilutes the chlorine dioxide which has just formed. The mixing tube 2 is dimensioned so that the reaction of the components is complete before entry of the ancillary water: for this purpose, the mixing tube 2 is provided with a slenderness ratio of about 5.4 along the reaction section from the joining point 6 to the ancillary entry openings 10 (drawing not true to scale).

Table 1 shows the actual dimensions of three possible sizes of the apparatus by way of example. Each of the sizes produces a water/chlorine dioxide solution having a $ClO_2$ content of 2 grams per liter.

TABLE 1

| Size | [—] | I | II | III |
|---|---|---|---|---|
| Production rate for chlorine dioxide | [kg/h] | 1 | 10 | 20 |
| Outflow of enriched exit water from suction pump | [kg/h] | 500 | 5000 | 10 000 |
| Chlorine dioxide concentration of exit water from suction pump | [g/l] | 2 | 2 | 2 |
| Inflow of feed water into suction pump | [kg/h] | 250 | 1000 | 2000 |
| Inflow of hydrochloric acid [30% strength] | [kg/h] | 6.4 | 64 | 128 |
| Inflow of sodium chlorite [25% strength] | [kg/h] | 6.7 | 67 | 134 |
| Internal diameter of mixing tube | [mm] | 14 | 34 | 45 |
| Length "active section" of mixing tube | [mm] | 99 | 184 | 262 |
| Slenderness ratio | [—] | 7.1 | 5.4 | 5.8 |

The form of the suction chamber 4 is very substantially part of the prior art: feed water to be enriched with chlorine dioxide is passed via a feed water pipe 11 into a tapering nozzle 12 in which the flow rate of the feed water greatly increases. As the cross section of the suction chamber 4 is substantially greater than the exit cross section of the nozzle 12, the pressure of the feed water which is sprayed in decreases greatly in the suction chamber, resulting in suction which sucks the reaction components and the ancillary water from the mixing tube 2 into the suction chamber 4 and produces vortexing, i.e. further dilution. The mixture leaves the apparatus 1 as exit water via an exit water pipe 13.

Feed water pipe 11 and exit water pipe 13 extend radially relative to the mixing tube 2, at least in the region of the suction chamber. This has the advantage that the mixing tube can be clamped by means of a clamping set 14 between the suction chamber 4 and the base plate 3. A closed force flux prevails via clamping set 14, suction chamber 4, mixing tube 2 and base plate 3 and prevents bursting of the apparatus in the case of an explosion of the components within the apparatus. Moreover, owing to the clamping set, mixing tube, base plate and suction chamber are joined in an interlocking manner to one another so that material bonding of these components, which is problematic in the case of this material combination, is dispensed with. Furthermore, the clamping set 14 has strain relief means 15a, 15b for the hoses 9a and 9b, and an eye bolt 16 for lowering the apparatus 1 in a water bath.

The apparatus according to the invention is in fact particularly preferably operated as an immersion reactor within a water bath, the water of which is to be enriched with chlorine dioxide. For this purpose, the apparatus is immersed in the water bath at least to such an extent that the ancillary entry opening(s) is or are below the water level. Most preferably, the apparatus is completely immersed in the water bath and may rest with its base plate on the bottom.

FIG. 3 illustrates this use for the example of a power station cooling tower. In the cooling tower 17, the cooling water laden with the waste heat of a power station or of another process is cooled in a manner known per se. For this purpose, a so-called basin 18 which contains a large amount of cooling water is present below the cooling tower 17. A cooling water pump 19 continuously draws cold cooling water from the basin 18 and transports it to the process to be cooled, which is not shown here. From there, the heated cooling water returns to the cooling tower via a return pipe 20 and trickles down the inside thereof into the basin 18. As a result, the cooling water is cooled by the air draft ascending through the cooling tower 17 owing to the chimney effect.

In order to prevent the biological growth in the cooling tower 17, the strong biocide chlorine dioxide is added to the cooling water.

For this purpose, the apparatus 1 is completely immersed as an immersion reactor in the basin 18 filled with the water to be treated. The apparatus 1 then rests with its base plate 3 on the bottom of the basin 18. The mixing tube 2 extends vertically through the water to be treated. The two reaction components are transported from respective tanks 8a, 8b via hoses 9a, 9b, driven by metering pump 7a, 7b, into the apparatus 1. The feed water originates from the cooling circulation and is passed into the apparatus 1 by means of the feed water pipe 11 branching off from the return pipe 20. The delivery pressure is finally built up by the cooling water pump 19. The feed water mixes in the suction chamber with the freshly prepared chlorine dioxide and with the ancillary water entering the apparatus 1 through the ancillary entry openings 10 from the basin 18 and is returned to the basin 18 via the exit water pipe 13.

LIST OF REFERENCE NUMERALS

1 Apparatus
2 Mixing tube
3 Base plate
4 Suction chamber
5a Feed pipe one
5b Feed pipe two
6 Joining point
7a Pump
7b Pump
8a Tank
8b Tank
9a Hose
9b Hose
10 Ancillary entry opening
11 Feed water pipe
12 Nozzle
13 Exit water pipe
14 Clamping set
15a Strain relief means
15b Strain relief means
16 Eye bolt
17 Cooling tower
18 Basin
19 Cooling water pump
20 Return pipe

The invention claimed is:

1. A system for feeding chlorine dioxide to water, comprising:
    a water bath; and
    a device submersed in the water bath for generating and/or supplying chlorine dioxide to the water bath;
    wherein the device comprises in vertical order from lowermost to uppermost:
    a base plate having a first feed pipe and
    a second feed pipe;
    a mixing tube comprising a lower region wherein the first and second feed pipes enter at a joining point and an upper region comprising an ancillary entry open to the water bath; and
    a suction chamber at an upper end of the mixing tube and open to the mixing tube; and
    a clamping set suitable for exerting an axial force on the mixing tube between the base plate and the suction chamber;
    wherein the suction chamber comprises:
    a water feed nozzle for spraying water into an upstream portion of the suction chamber, and
    an exit water pipe in a downstream portion of the suction chamber, and
    wherein the base plate closes the lower region of the mixing tube.

2. The system according to claim 1,
    wherein the ancillary entry opening is located downstream of the joining point such that reaction of components entering at the joining point is complete at the ancillary opening.

3. The system according to claim 1, wherein the water feed nozzle and the exit water pipe are coaxial with one another in a region of the suction chamber.

4. The system according to claim 3, wherein the mixing tube extends radially relative to the axis of the water feed nozzle and the exit water pipe, in the region of the suction chamber.

5. The system according to claim 3, wherein the mixing tube extends coaxially with the axis of the water feed nozzle and the exit water pipe, in the region of the suction chamber.

6. The system of claim 1, wherein a slenderness ratio of the mixing tube, as measured from the joining point furthest downstream to the ancillary entry opening is between five and eight.

7. The system of claim 1,
    wherein the mixing tube is immersed in the water bath such that ancillary water from the water bath enters the mixing tube through the ancillary entry opening.

8. The system according to claim 7, wherein the exit water pipe opens into the water bath.

9. The apparatus according to claim 1, further comprising:
    a feed water pipe leading from the water bath to the nozzle.

10. The system of claim 7, wherein the water bath is a basin of a cooling tower.

11. A system for adding chlorine gas to water, comprising:
    a water bath; and
    a device submersed in the water bath for supplying chlorine to the water bath;
    wherein the device comprises in vertical order from lowermost to uppermost:
    a base plate having a feed pipe suitable for feeding chlorine gas,
    a mixing tube suitable for mixing the chlorine gas with water, wherein the feed pipe enters the mixing tube at a first end of the mixing tube, and an ancillary entry open to the water bath at a second end of the mixing tube,
    a suction chamber at a second end of the mixing tube and open to the mixing tube,
    a clamping set suitable for exerting an axial force on the mixing tube between the base plate and the suction chamber;
    wherein the suction chamber comprises:
    a water feed nozzle for spraying water into an upstream portion of the suction chamber, and
    an exit water pipe in a downstream portion of the suction chamber, and
    wherein the base plate closes the lower region of the mixing tube.

12. The system according to claim 11, further comprising:
    a second feed pipe for feeding water into the mixing tube, the second feed pipe joining at the first end of the mixing tube.

13. The system according to claim 11, wherein the exit water pipe opens into the water bath.

14. The system according to claim 11, further comprising:
    a feed water pipe leading from the water bath to the nozzle.

15. The system of claim 11, wherein the water bath is a basin of a cooling tower.

* * * * *